(12) United States Patent
De With et al.

(10) Patent No.: US 6,339,671 B1
(45) Date of Patent: *Jan. 15, 2002

(54) SYSTEM AND METHOD FOR IMPROVING VIDEO RECORDER PERFORMANCE IN A SEARCH MODE

(75) Inventors: Peter H. N. De With; Stephanus J. J. Nijssen, both of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/575,974

(22) Filed: May 23, 2000

Related U.S. Application Data

(62) Division of application No. 08/734,712, filed on Oct. 21, 1996, now Pat. No. 6,072,935, which is a continuation of application No. 08/531,882, filed on Jan. 2, 1996, now abandoned, which is a continuation of application No. 08/204,904, filed on Mar. 2, 1994, now abandoned, which is a continuation of application No. 07/865,525, filed on Apr. 9, 1992, now abandoned.

(30) Foreign Application Priority Data

Apr. 18, 1991 (EP) .............................. 91200919

(51) Int. Cl.$^7$ ............................ H04N 5/783; H04N 5/92
(52) U.S. Cl. ........................ 386/68; 386/112; 386/124
(58) Field of Search .............................. 386/46, 68, 80, 386/81, 112, 124, 109; 348/420.1; H04N 5/783, 5/92

(56) References Cited

U.S. PATENT DOCUMENTS 5,175,631 A * 12/1992 Juri et al. .................... 386/109
6,072,935 A * 6/2000 De With et al. .............. 386/68

* cited by examiner

Primary Examiner—Huy Nguyen
(74) Attorney, Agent, or Firm—Edward W. Goodman

(57) ABSTRACT

A method and apparatus wherein video images are recorded on a plurality of tracks of a tape such that, for playback in a search mode at a speed higher than the recording speed the displayed image will consist of a plurality of contiguous parts, some of the parts being read out from tracks each having a different frame recorded thereon.

11 Claims, 4 Drawing Sheets

FIG.5a
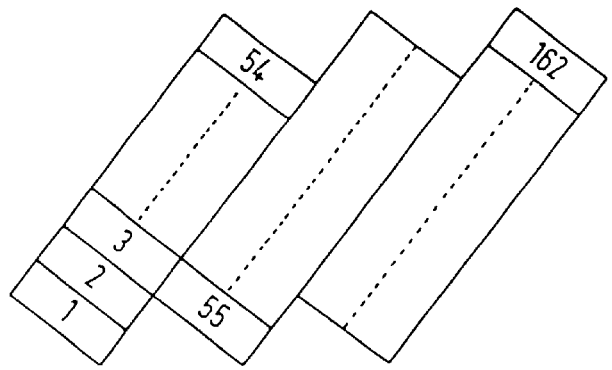
FIG.5b
FIG.5c

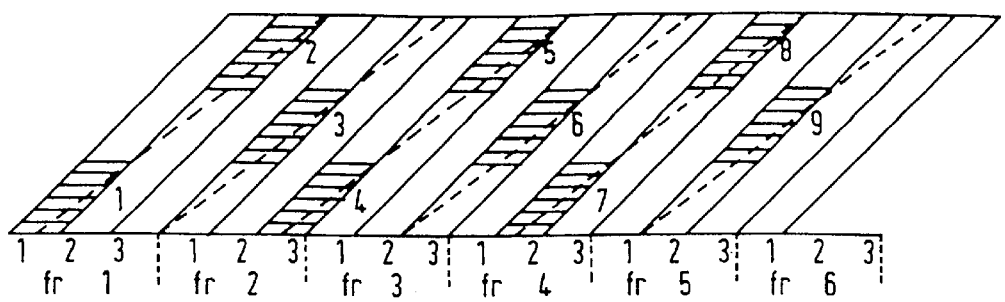
FIG. 6
| 1 (fr=1) | 3 (fr=2) | 5 (fr=3) |
|---|---|---|
| 7 (fr=4) | 9 (fr=5) | 2 (fr=1) |
| 4 (fr=2) | 6 (fr=3) | 8 (fr=4) |
FIG. 7
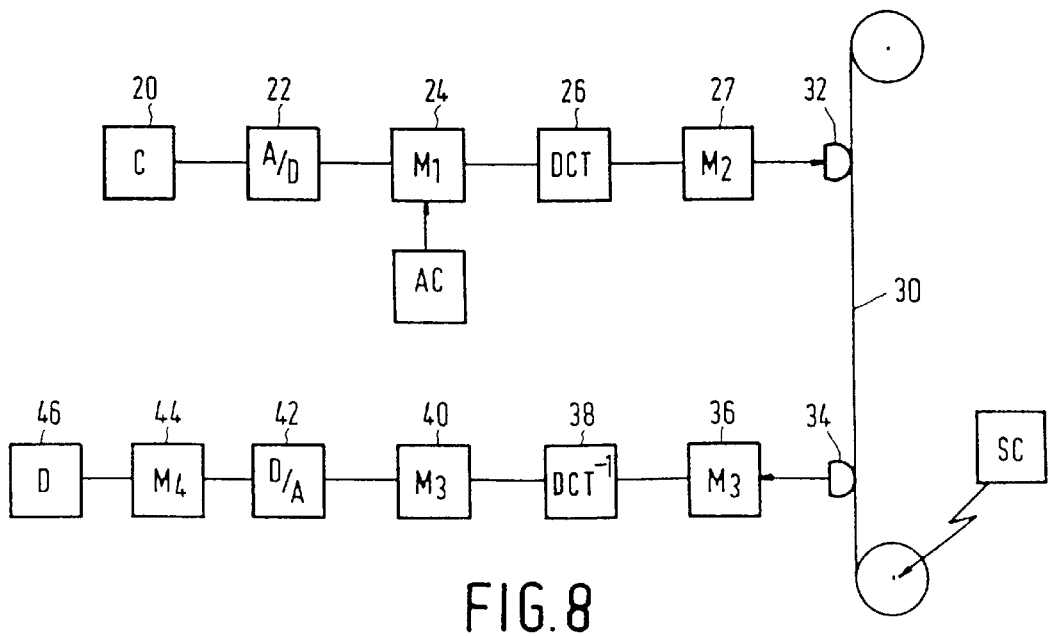
FIG. 8

SYSTEM AND METHOD FOR IMPROVING VIDEO RECORDER PERFORMANCE IN A SEARCH MODE

CROSS-REFERENCE TO RELATED APPLICATIONS

This is a divisional of U.S. patent application Ser. No. 08/734,712, filed Oct. 21, 1996, now U.S. Pat. No. 6,072,935, which is a continuation of U.S. patent application Ser. No. 08/531,882, filed Jan. 2, 1996, now abandoned, which is a continuation of U.S. patent application Ser. No. 08/204,904, filed Mar. 2, 1994, now abandoned, which is a continuation of U.S. patent application Ser. No. 07/865,525, filed Apr. 9, 1992, now abandoned.

BACKGROUND OF THE INVENTION

1. Field of The Invention

The present invention applies to video recorders and, specifically, to video recorders operative with playback at the recording speed and at least one other speed.

2. Description of The Related Art

The problem of creating adequate pictures or images from a video recording played back at the recording speed, and one or more higher speeds in a search mode has been addressed before. It is discussed in a publication entitled "Introduction to the 4:2:2 Digital Video Tape Recorder" by Stephen Gregory of the Sony Broadcasting Company, published by Pentech Press, London, 1988. Chapter 7 teaches a method of pixel-based shuffling for improving the robustness of the system and for recovering pictures in multispeed modes. Briefly, arrays are formed of pixels whose position has been scrambled. The position of the arrays is then scrambled, first within a field and subsequently over four consecutive fields.

This is a very complicated method and yields reasonable results at high speeds, but decreases the picture quality at the lower search speeds. Further, no data compression takes place.

SUMMARY OF THE INVENTION

It is an object of the present invention to furnish a method and system in which acceptable picture quality both at higher and lower search speeds is obtained, preferably in combination with data compression.

The present invention is a method of recording data defining a plurality of images on substantially parallel tracks of a recording medium at a recording speed, for playback at said recording speed and at least one additional speed. It comprises the steps of generating a plurality of basic segments for each of said images in response to received image data, each of said basic segments defining an incremental part of an image extending in a first direction and in a second direction transverse to said first direction.

The basic segments are recorded on the tracks as a plurality of sub-sequences each defining a first contiguous part of the image exceeding said incremental part in area. Sequentially recorded sub-sequences in turn define second contiguous parts of the image, greater than the first contiguous parts. All sub-sequences on one track, together defining a third contiguous part of the image exceeding in area said second contiguous part, constitute a sequence. The present invention also constitutes a method for generating display signals for display of an image. Bursts of data (macrosegments) are read from a recording medium at a selected speed exceeding the recording speed of the data. The recording medium has a plurality of tracks each having at least part of one of a plurality of sequential images recorded thereon. Each of the bursts of data comprises data defining a contiguous area of one of the images, while a plurality of bursts, varying in number in correspondence to the ratio of the selected speed to the recording speed, defines all parts of an image.

The data of the read-out bursts is stored in a memory until the plurality of bursts has been received, and then read from the memory in a sequence and at a rate suitable for display, thereby creating the display signals.

The present invention further constitutes a recording medium having a plurality of tracks, a plurality of images being recorded on the tracks, each of said tracks having a data sequence defining a first contiguous area of one of the images, said sequence comprising a plurality of sequentially recorded sub-sequences each defining a second contiguous area smaller than that first contiguous area, each of said sub-sequences comprising a plurality of sequentially recorded basic segments each defining a third area of said image, the plurality of third areas together constituting one of the second areas.

The present invention also constitutes an apparatus for recording video signals defining a plurality of images on a plurality of tracks of a recording medium for replay at the recording speed and at least one higher speed. Coding means are provided for encoding said video signals into basic segments, each basic segment defining an incremental area of one of said images.

Memory means store a plurality of said basic segments, addressing means reading out a plurality of sub-sequences, each comprising basic segments defining contiguous parts of said image, from said memory means in a predetermined order, thereby furnishing read-out sequences. Recording means record the read-out sub-sequences on tracks of the recording medium.

During playback at a speed exceeding the recording speed, only part of the data on each track will be read out. Of this, only a part will have a SNR sufficiently high for use in an error correcting code. This latter part is called a macro-segment herein.

The present invention also constitutes an apparatus for furnishing display signals in response to macro-segments of data read from a recording medium at a speed different from the recording speed. It comprises means for storing the macro-segments together constituting an image, and means for reading out the stored data in a sequence and at a rate suitable for application to display means.

BRIEF DESCRIPTION OF THE DRAWINGS

The present invention, its operation and further advantages thereof will be further clarified in the following description of preferred embodiments when taken in conjunction with the drawings, in which:

FIG. 1b is a diagram showing the variation of signal-to-noise ratio with head position in FIG. 1a;

FIG. 5a illustrates the composition of a basic segment;

FIG. 5b shows an image divided into macro-segments and basic segments;

FIG. 5c is a schematic diagram illustrating tape tracks having the segments of FIG. 5b recorded thereon;

FIG. 6 illustrates macro-segment bursts recoverable at 2.5 times the recording speed according to the system and method of the present invention;

FIG. 7 illustrates the corresponding reconstructed image; and

FIG. 8 is a block diagram of the recording and playback system according to the present invention.

DESCRIPTION OF THE PREFERRED EMBODIMENTS

Figure 1A:
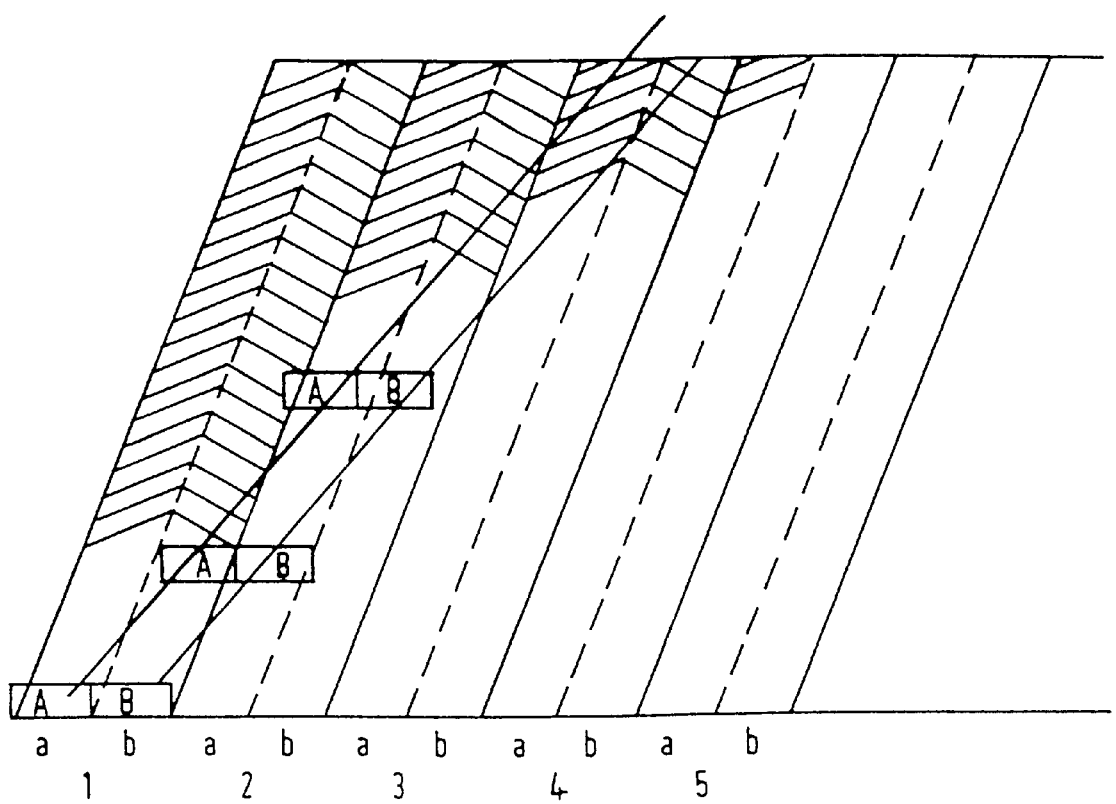
FIG. 1a is a schematic diagram showing tack pairs and head pairs in azimuth recording.

The problem to be solved by the present invention is to furnish a video recorder/playback system and method which yields the best possible images for playback at the recording speed as well as at higher speeds, during, for example, a search mode. The solution to this problem in accordance with the present invention will be analyzed based on a preferred embodiment in which azimuth recording is used, i.e., the information is recorded on neighboring tracks with opposite azimuth. This is illustrated in FIG. 1a where the two neighboring tracks are denoted by a and b, respectively, and information is recorded and read from the track pairs by a head pair A, B. As is well-known, the gap in head A is so oriented that it can only read information from the a track, while head B can read information only from the b track. In the preferred embodiment, it is also assumed that the width of the head is equal to the width of the track and that there are 6 tracks, i.e., 3 track pairs, per frame. The track pairs are numbered 1, 2, 3 etc. in FIG. 1a.

Figure 1B:
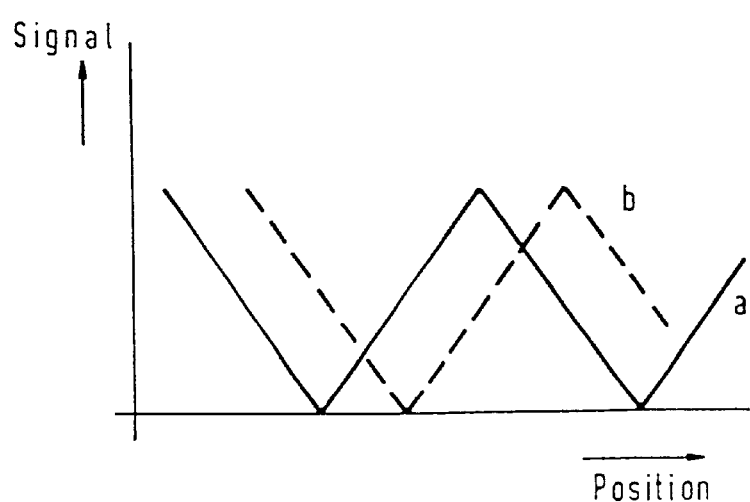

Again referring to FIG. 1a, the head pair AB will, during recording, and during playback at the recording speed, travel along the tracks so that the highest signal-to-noise ratio is always obtained. However, at a higher playback speed, the heads will not travel parallel to the tracks, but will take the paths illustrated in FIG. 1a by two solid lines, one for head B and one for head A. These paths involve the crossing of tracks and, therefore, a variation of the signal-to-noise ratio furnished by the heads as a function of position. This variation is illustrated in FIG. 1b with a solid line for head A and a dashed line for head B. For any particular application, there is a minimum value of the amplitude plotted in FIG. 1b (SNR) required to detect bits with an error rate that can be handled by the error correction coding system.

Figure 2:
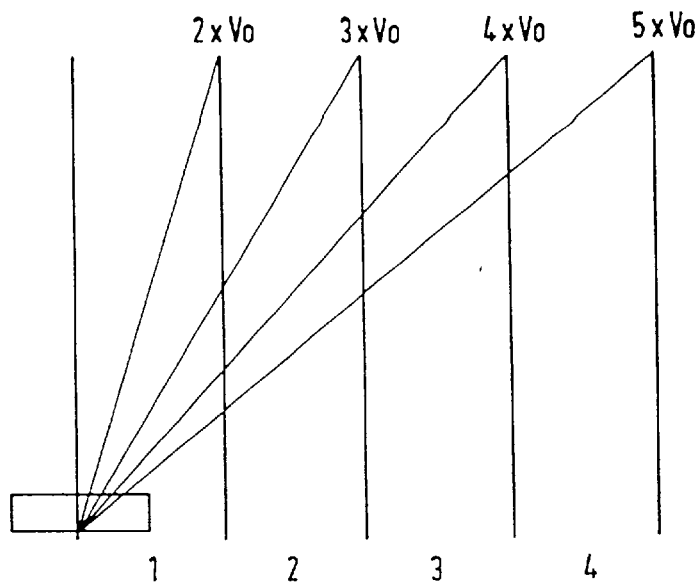
FIG. 2 is a diagram illustrating the head vs. track movement at a plurality of speeds exceeding the recording speed.

For a simplified model assuming perfect linear tracks and heads with an effective width equal to the track width, the direction of head motion as a function of the multiple of the recording speed at which playback occurs, is shown in FIG. 2. Also, as illustrated in FIG. 2, the head pair is preferably not in its recording or normal playback position at the start, but is located so that the centre of head A coincides with the edge of the track, i.e., in a position where the SNR is just sufficient to start data recovery. This change in relative position of head to tape takes place automatically simultaneously with selection of a search mode by the user, and minimizes track crossings. With this positioning, no track crossings occur at twice the recording speed, one crossing occurs at 3 times the recording speed, etc. At a playback speed of p×v0, where p is the speed ratio and v0 the recording speed each data burst is $1/(p-1)$ of a track-length long. Since only a fraction f of a data burst can be used, the usable data part when track crossing is involved is $f \times 1/(p-1)$ at a playback speed which is p times the recording speed. For $f=1/2$, the usable data is $1/\{2(p-1)\}$.

Figure 3:
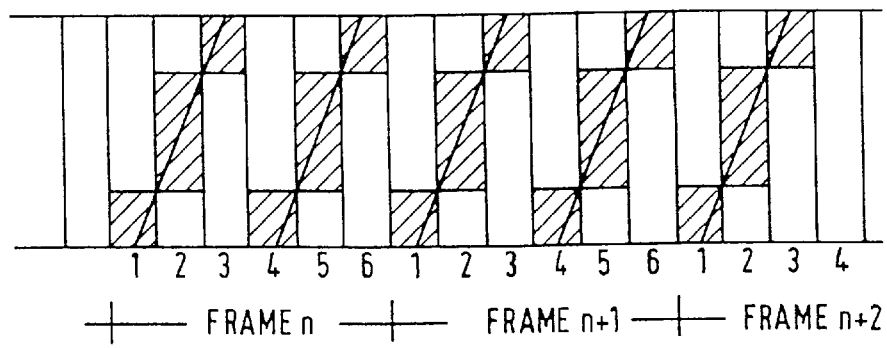
FIG. 3 is a diagram illustrating a problem which arises for an unacceptable ratio of playback speed to recording speed.
Figure 4:
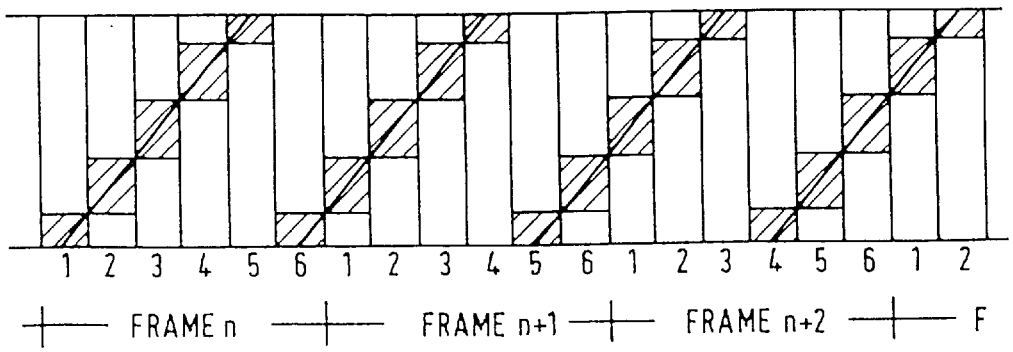
FIG. 4 is a schematic diagram illustrating head vs. track movement at an acceptable speed higher than the recording speed.

The macro-segments derived from sequential tracks are to be stored in memory, and subsequently read out from memory for application to a video display system to recreate a whole image. As discussed above and illustrated in detail in FIGS. 3 and 4 for different playback speeds, only part of the information recorded on each track can be read out at such higher-than-recording (search) speeds. Therefore, even after all tracks associated with a given frame of the video signal have been scanned, some parts of the image (indicated by blank track portions in tracks 1–6 of frame n) are still missing. According to the invention, the corresponding parts of subsequently received frames, recorded on subsequent tracks, are to be used to fill in the missing parts. As is illustrated in FIG. 3, (for f=1), this cannot be accomplished when the playback speed is three times the recording speed. Only the first part of tracks 1 and 4 is read, while the middle part of tracks 2 and 5 and the last part of tracks 3 and 6 are read for all frames. The other parts of the tracks are never scanned. The reason for this is that p is an integral (sub) multiple of the number of tracks per frame: N/p=6/3=2. On the other hand, as illustrated in FIG. 4, at a playback speed which is five times the recording speed, all parts of each track will be read within five sequential frames. It is thus a requirement that any speed for quick search be such that neither N/P nor P/N is an integer.

According to the invention, data is recorded on the tape in such a way that each of the above-mentioned macro-segments defines a horizontally and/or vertically contiguous part of the image, each part being as square as possible. The recording is also such that a macro-segment, i.e., data defining a contiguous image portion, is read out from each track at different quick-search speeds, the only difference being that the higher the quick-search speeds, the smaller the amount of data within a macro-segment and, therefore, the larger the number of macro-segments per displayed frame. Read-out from storage for display purposes proceeds in the normal line-by-line scanning pattern. This recording scheme will now be discussed in greater detail with reference to FIGS. 5 and 6.

Referring first to FIG. 5a, this illustrates the basic segments of which the image is constructed in a preferred embodiment. Each basic segment contains sixty discrete cosine transform (DCT) encoded blocks of 8×8 pixels, all the blocks inside of the segment being adjacent blocks in the image. Each basic segment contains luminance blocks, Y, associated with 4 block lines and 10 block columns, as well as the corresponding chrominance blocks (UV). The exact structure of the basic segments with respect to the number of pixels and the type of coding is not important to the present invention. Even a single block could be used. Also, the blocks can be encoded in a variable or fixed word-length format. The latter is used for convenience in the preferred embodiment. With variable word-length coding, the block-length will tend to average out: alternatively, the number of bits per basic segment, or per sequence or sub-sequence can be fixed. A wide variety of embodiments will be readily apparent to one skilled in the art. However, a contiguous area of the image to be displayed is always represented in each basic segment.

Referring now to FIG. 5b, the illustrated rectangle represents one frame of a received video signal. The word "frame" as used herein can also include a field, since a field can be considered as a frame with lower resolution. The image represented in the frame is first divided into three horizontal sections A, B, C. Each of these sections contains fifty-four basic segments. Reference to FIG. 5c shows that the fifty-four basic segments associated with each of the horizontal sections are recorded on respective track pairs, i.e., constitute a "sequence" as defined herein. The order in which recording takes place is indicated by the numbering of the basic segments in FIG. 5b, i.e., it is carried out in a column-by-column basis, each column containing 6 vertically adjacent basic segments, constituting a "sub-sequence".

Close examination of this type of block shuffling shows that, as discussed above, it yields macro-segments of adjacent blocks at a plurality of speeds exceeding the recording speed. Also, since the length of each basic segment exceeds its height, column-by-column recording results in macro-segments which are as square as possible.

As will be shown below with reference to FIGS. 6 and 7, one-third of a track and, therefore, for the given embodiment, one-ninth of the frame constitutes a macro-segment at playback at two and a half times the recording speed. At five and a half times the recording speed, one-ninth of the track, namely, columns of six vertically adjacent basic segments, constitute a macro-segment, etc. Playback speeds at which a non-integral number of basic segments per macro-segment would be required would not result in optimum picture quality. For example, at five times the recording speed, one-eighth of a track or one-eighth of fifty-four basic segments would constitute a macro-segment. This playback speed should preferably not be chosen even if it meets the N/p requirement specified above.

For a specific illustration of the reconstruction of the image from the macro-segments read from the tape at two and a half times the recording speed, reference is made to FIGS. 6 and 7. In FIG. 6, sequential frames are indicated by "fr 1", "fr 2", etc. Above the frame notation are the track pairs associated with each frame, namely, 1, 2 and 3. The track areas from which usable information is read out when the playback speed is two and a half times the recording speed, are indicated by horizontal lines and are numbered in the order of read-out.

FIG. 7 shows how the data read out from the indicated track areas is put together in memory to constitute the image. Track area 1 of FIG. 6, for example, contains information corresponding to the left-most image portion of track a of FIG. 5b and, thus, the corresponding part of the image in FIG. 7. Next, the right-most portion of track 2 is read out, resulting in the filling in of the image portion labelled 2 in FIG. 7. No portion of the third track of frame 1 can be read out, the next available macro-segment being the middle portion of the first track of frame 2, which results in the addition of the image portion marked 3 in FIG. 7. The readout continues until the middle area of track 2 of frame 5 is read out. This completes the image by furnishing data required to reconstruct its central part. While it is true that the parts of the image are not all derived from the same frame, this will make no difference if a still picture is concerned. If there is movement from frame to frame, the errors which are created are not visually too disturbing because the probability of motion occurring within a block which has both horizontal and vertical dimensions is quite high and the visually, particularly disturbing artefacts created by a constant error along a horizontal or vertical line extending all along the image are avoided.

One embodiment of apparatus required to carry out the present invention is illustrated in FIG. 8. For recording, a video camera 20 is provided. The output of video camera 20 is applied to an analog-digital converter 22. The digitized information at the output of analog-digital (A/D) converter 22 is stored in a memory 24 to allow formation of the 8×8 pixel blocks by use of address control AC. The blocks are encoded by a discrete cosine transform (DCT) in a transform stage 26 as shown, e.g., in European Patent Application EP 0 286 184 filed Jun. 4, 1988 and published Dec. 10, 1988, corresponding to U.S. Pat. No. 4,881,192. Other codes could be used. In any event, data compression takes place. The addresses and amplitudes constituting the DCT blocks are again stored, (M2, which may be part of M1) to allow readout as basic segments in the order required for recording the desired sub-sequences illustrated in FIGS. 5b and 5c on a tape 30 by a recording head 32.

For display, the data on the tape is read out by a read head 34. The speed at which the readout takes place is controlled by a speed control SC. When readout is taking place at the recording speed, the data is applied to a third memory 36 in the consecutive order of basic segments indicated in FIGS. 5b and 5c. If the readout is at other than the recording speed, namely, at a higher search speed selected to assure that all image-bearing parts of the tape will be read, the data will be received in memory 36 as macro-segments, shown in FIGS. 6 and 7. The data is applied to a stage 38 to perform the inverse discrete cosine transformation. The output of stage 38 is applied, possibly via a memory 40, to digital-to-analog (D/A) converter 42. The output of D/A 42 is stored in a display memory 44, which is a full frame memory, the contents of which are displayed line-by-line on a display 46.

It should be noted that in above description, many items, such as modulators required before recording, demodulators required after readout, etc., have been omitted for the sake of clarity. Other components, such as the DCT coding stage, could be omitted or another type substituted. Memories can be combined or possibly omitted (e.g., memory 40). Basic segments may contain data from more than one frame, etc.

Thus, the present invention has been disclosed in a preferred embodiment, but other embodiments will readily occur to one skilled in the art and are intended to be encompassed in the following Claims.

What is claimed is:

1. A method for shuffling digital data defining, on display, a plurality of images so as to enable recording said shuffled data on substantially parallel oblique tracks of a longitudinal record carrier, said method comprising the steps:

(a) generating blocks of coded data, each block including a plurality of pixels defining, on display, a rectangular area of one of said plurality of images;

(b) combining a plurality of blocks to form basic segments, each of said basic segments defining, on display, an incremental area of said one of said plurality of images;

(c) shuffling sequences of said basic segments so as to obtain a shuffled sequence of said basic segments, each shuffled sequence comprising a plurality of sub-sequences of basic segments, each sub-sequence defining, on display, a first contiguous part of said one of said plurality of images consisting of a plurality of said incremental areas lined up along a first axis, the sub-sequences of the sequence together defining, on display, a second contiguous part composed of first contiguous parts of said one of said plurality of images lined up along a second axis orthogonal to the first axis; and (d) outputting said shuffled sequence.

2. The method as claimed in claim 1, wherein each of said basic segments defines, on display, an area having a longer length along said second axis than along said first axis perpendicular to said second axis, and wherein said sub-sequences extend along said first axis.

3. The method as claimed in claim 1, wherein said second axis is in a horizontal direction and said first axis is in a vertical direction, and wherein said sub-sequences comprise columns of basic segments having data defining, on display, vertically adjacent image elements.

4. A method for deshuffling shuffled display signals for display of an image in response to digital data received, the digital data comprising a shuffled sequence of a plurality of basic segments, each basic segment consisting of blocks of coded data including a plurality of pixels defining, on display, a rectangular area of said image, said basic segments defining on display an incremental area of said image, said shuffled sequence comprising a plurality of sub-sequences of a plurality of basic segments, each sub-sequence defining, on display, a first contiguous area of said image, the first contiguous areas being lined up along a first axis, the sub-sequences of the sequence together defining, on display, a second contiguous part composed of first contiguous parts lined up along a second axis orthogonal to said first axis, said method comprising the steps:

receiving portions of data of the shuffled display signals;

deshuffling the shuffled sequence of the plurality of basic segments into a deshuffled sequence so as to enable creating display signals; and outputting said deshuffled sequence.

5. The method as claimed in claim 4, wherein said deshuffling and outputting steps comprise:

storing said portions of data in a read-out memory until sub-sequences defining, on display, a whole image have been stored; and reading out image-defining data from said read-out memory in a sequence and at a rate suitable for display, thereby creating said display signals.

6. The method as claimed in claim 4, wherein the method further comprises the step:

decoding said deshuffled sequence before creating said display signals.

7. An apparatus for shuffling digital data defining, on display, a plurality of images so as to enable recording said shuffled data on substantially parallel oblique tracks of a longitudinal record carrier, said apparatus comprising:

(a) means for generating blocks of coded data, each block including a plurality of pixels defining, on display, a rectangular area of one of said plurality of images;

(b) means for combining a plurality of blocks to form basic segments, each of said basic segments defining, on display, an incremental area of said one of said plurality of images; and (c) means for shuffling sequences of said basic segments so as to obtain a shuffled sequence of said basic segments, each shuffled sequence being a plurality of sub-sequences of basic segments, each sub-sequence defining, on display, a first contiguous part of said one of said plurality of images consisting of a plurality of said incremental areas lined up along a first axis, all of the sub-sequences on a track together defining, on display, a second contiguous part composed of first contiguous parts of said one of said plurality of images lined up along a second axis orthogonal to the first axis; and (d) means for outputting said shuffled sequence.

8. An apparatus for deshuffling shuffled display signals for display of an image in response to digital data received, the digital data comprising a shuffled sequence of a plurality of basic segments, each basic segment consisting of blocks of coded data including a plurality of pixels defining, on display, a rectangular area of said image, said basic segments defining on display an incremental area of said image, said shuffled sequence comprising a plurality of sub-sequences of a plurality of basic segments, each sub-sequence defining, on display, a first contiguous area of said image, the first contiguous areas being lined up along a first axis, the sub-sequences of the sequence together defining, on display, a second contiguous part composed of first contiguous parts lined up along a second axis orthogonal to said first axis, the apparatus comprising:

means for receiving portions of data of the shuffled display signals;

means for deshuffling the shuffled sequence of the plurality of basic segments into a deshuffled sequence so as to enable creating display signals; and means for outputting said deshuffled sequence.

9. The apparatus as claimed in claim 8, wherein said deshuffling and outputting means comprise:

means for storing said portions of data in a read-out memory until sub-sequences defining, on display, a whole image have been stored; and means for reading out image-defining data from said readout memory in a sequence and at a rate suitable for display, thereby creating said display signals.

10. Apparatus as claimed in claim 8, wherein said apparatus further comprises:

means for decoding said deshuffled sequence before creating said display signals.

11. The apparatus as claimed in claim 8, wherein said apparatus further comprises:

display means for displaying said display signals.

* * * * *